(No Model.)

W. W. GRIER.
FIFTH WHEEL FOR VEHICLES.

No. 447,312. Patented Mar. 3, 1891.

WITNESSES.

INVENTOR.

UNITED STATES PATENT OFFICE.

WILLIAM W. GRIER, OF HULTON, PENNSYLVANIA.

FIFTH-WHEEL FOR VEHICLES.

SPECIFICATION forming part of Letters Patent No. 447,312, dated March 3, 1891.

Application filed June 9, 1890. Serial No. 354,765. (No model.)

*To all whom it may concern:*

Be it known that I, WILLIAM W. GRIER, of Hulton, in the county of Allegheny and State of Pennsylvania, have invented a new and useful Improvement in Fifth-Wheels for Vehicles, of which the following is a full, clear, and exact description, reference being had to the accompanying drawings, forming part of this specification, in which—

Figure 1:
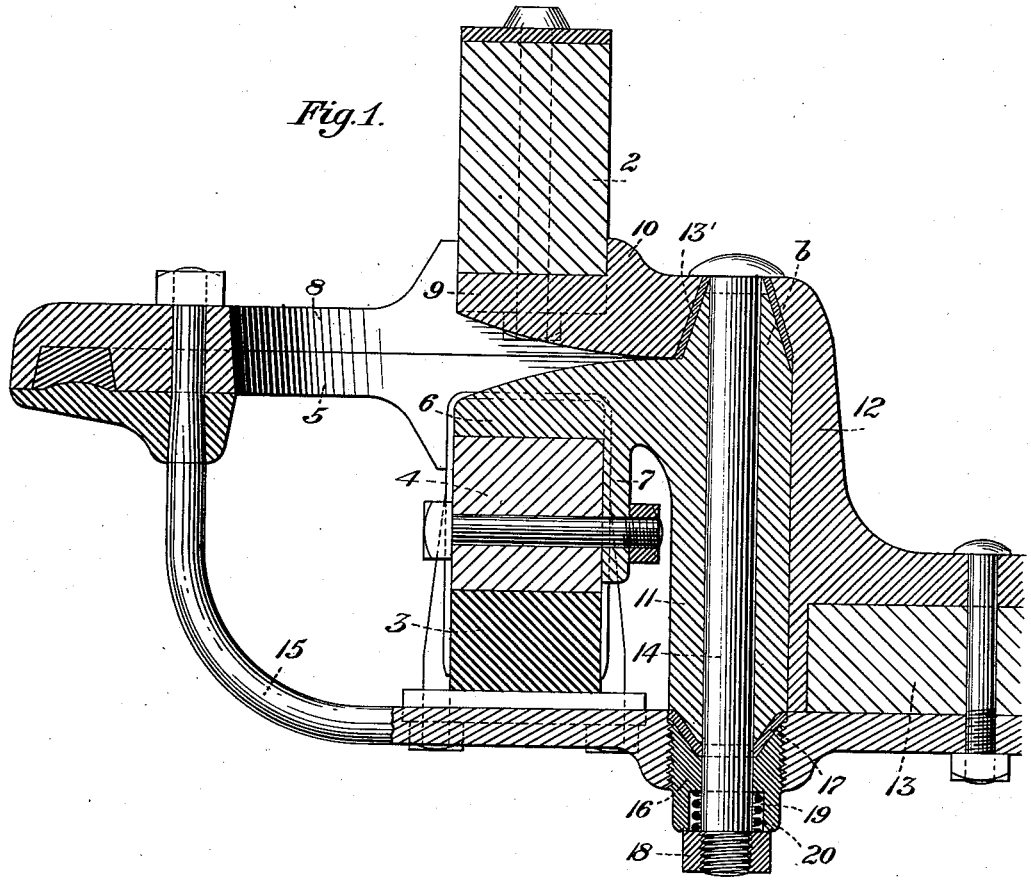
Figure 2:
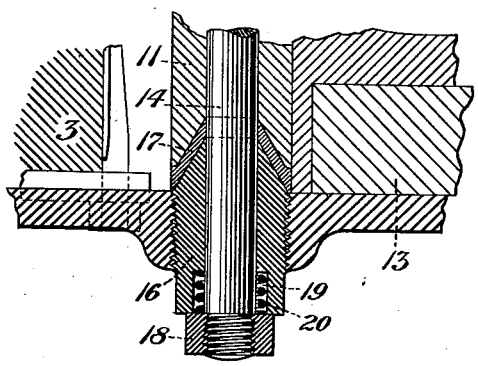

Figure 1 is a vertical sectional view of a fifth-wheel constructed according to my invention. Fig. 2 is a sectional detail view illustrating a modification.

Like symbols of reference indicate like parts in each.

In the drawings, 2 represents the head-block of a vehicle.

3 is the front axle; 4, the axle-bed.

5 is the lower circle-plate of the fifth-wheel, which is secured to the axle-bed by a saddle 6 and a lug or lugs 7, and 8 is the upper circle-plate, which is similarly secured to the head-block by a saddle 9 and a lug or lugs 10.

11 is an upright tubular socket, which projects rearwardly from the head-block, and is preferably made integral with the saddle 6.

12 is the upper reach-iron, which extends from the reach 13 upwardly to the head-block, to which it is secured, being preferably made integral with the saddle 9 and the upper circle-plate. The upper end $b$ of the socket 11 is preferably conical and fitted in a conical socket at the upper portion of the reach-iron 12, and in order to prevent rattling and loose wear I may place a washer 13′, of leather or other soft material, between the part $b$ and its bearing in said socket.

14 is the king-bolt, which extends through the parts 11 and 12, as shown.

15 is a brace, which is secured to the reach and extends therefrom to the upper circle-plate, to which it is held by suitable means. The king-bolt passes through a threaded socket in this brace and through a nut 16, which is screwed into this socket. The inner end of the nut 16 bears against the end of the tubular socket 11, or against a flexible washer 17, which I prefer to interpose between these parts. In order to afford means of taking up wear and preventing rattling, I make the meeting ends of the nut 16 and socket 11, respectively convex and concave, approximately conical. In Fig. 1 I show the concavity in the nut. In the modification illustrated in Fig. 2 the concavity is in the socket and the convexity at the end of the nut.

18 is a keeper-nut fitted to the threaded projected portion of the king-bolt below the nut 16.

19 is recess formed at the lower end of the nut 16, in which is a spring 20, which encircles the king-bolt and bears in opposite directions against the nuts 16 and 18.

When in position for use, the parts are fitted together in the manner shown in Fig. 1. When thus fitted, the structure is compact, capable of resisting great strain, and the parts are not apt to wear loose and to rattle.

The function of the spring 19 is, in case of wear at the end of the socket 11, to hold the parts in their proper position and to prevent rattling. The concave and convex bearings at the ends of the socket 11 also afford efficient means for taking up wear and for enabling the parts to be readjusted, and the form and arrangement of the lower part of the socket 11 afford a positive connection between it and the reach-brace, thus enhancing greatly the strength and stability of the fifth-wheel.

My improved fifth-wheel embodies several novel features of construction which may be used independently of each other and in other combinations. They are individually pointed out in the several claims, each of which states an item of invention unqualified by peculiar limitations and elements expressed in the other claims.

I claim—

1. In a fifth-wheel, the combination of circle-plates adapted to be fitted to the head-block and axle-bed and having their center of motion back of the axle, an upright shank fixed to the axle and extending downwardly in the rear thereof, a reach-iron 12, which extends from the reach to the upper circle-plate and encircles the upper part of said hollow shank, a king-bolt which passes through the said reach-iron and shank, and a brace which extends from the reach to the circle-plate in front of the axle and has a positive lateral connection with the lower part of said shank, substantially as and for the purposes described.

2. In a fifth-wheel, the combination of circle-plates adapted to be fitted to the head-block and axle and having their center of motion back of the axle, an upright hollow shank situate back of and connected with the axle, and a brace which extends from the circle-plate to the reach and fits around the lower part of said shank, and a nut inserted in said brace and having a tapering connection with the shank, substantially as and for the purposes described.

3. In a fifth-wheel, the combination of circle-plates adapted to be fitted to the head-block and axle-bed, a king-bolt back of the axle, a brace extending from the lower part of the king-bolt, and a spring which bears on the king-bolt and on the brace and exerts thereon a longitudinally-acting force, substantially as and for the purposes described.

In testimony whereof I have hereunto set my hand this 28th day of May, A. D. 1890.

WILLIAM W. GRIER.

Witnesses:
THOMAS W. BAKEWELL,
R. H. WHITTLESEY.